METHOD OF FORMING ORTHODONTIC ARCHES

Filed July 3, 1948 4 Sheets-Sheet 1

INVENTOR.
WESLEY J. HENRY
BY
[signature]
ATTORNEY

Sept. 4, 1951 W. J. HENRY 2,566,414

METHOD OF FORMING ORTHODONTIC ARCHES

Filed July 3, 1948 4 Sheets-Sheet 2

INVENTOR.

WESLEY J. HENRY

BY

ATTORNEY

METHOD OF FORMING ORTHODONTIC ARCHES

Filed July 3, 1948 4 Sheets-Sheet 3

INVENTOR.

WESLEY J. HENRY

BY [signature]

ATTORNEY.

METHOD OF FORMING ORTHODONTIC ARCHES

Filed July 3, 1948 4 Sheets-Sheet 4

INVENTOR.
WESLEY J. HENRY
BY [signature]
ATTORNEY.

Patented Sept. 4, 1951

2,566,414

UNITED STATES PATENT OFFICE 2,566,414

METHOD OF FORMING ORTHODONTIC ARCHES

Wesley J. Henry, Los Angeles, Calif.

Application July 3, 1948, Serial No. 36,833

2 Claims. (Cl. 29—160.6)

This invention relates to orthodontic arches, and to the art of forming orthodontic arches. One of the chief objects of the invention is to increase the accuracy of an orthodontic's work. Another object is to decrease the amount of work involved in fitting an orthodontic arch to a patient's mouth.

Another object is to provide an orthodontic arch having a number of divisions (central incisor, lateral incisor, cuspid, bi-cuspid and molar) which are offset with relation to each other so as to conform to the symmetry of an average set of teeth, whereby a standardized arch may be employed to fit the tooth arch of any number of human jaws within a selected range of jaw sizes. A further object is to provide an arch adapted, in not more than three sizes, to serve the entire gamut of human jaw sizes.

The invention contemplates the provision of orthodontic arches in a minimum number of standardized, average sizes, each arch providing, within its size range, symmetry at the outset of an orthodontic operation and requiring a minimum amount of work and skill to adjust it to any existing deviation from the average arch to which it corresponds. In this connection, I have determined that the arches in the medium range are adaptable to 80% of all cases that are presented for orthodontic treatment.

In the matter of saving an orthodontist's time, the invention substantially eliminates the prevailing factors of bending orthodontic arches by hand. It makes it possible for an orthodontist, after having made a preliminary measurement of a patient's teeth to determine the arch size to be used, to simply reach into a drawer and select an arch which can be quickly adapted to the patient's jaw by slight adjustments in the over-all proportioning of the arch (e. g. an over-all narrowing of the arch to accommodate it to a narrow jaw or an overall widening of the arch to accommodate it to a wide jaw).

Another object of the invention is to provide an orthodontic arch having uniform torque throughout its length. This is virtually impossible to achieve in a hand-bent arch. Uniform torque is important because it makes it possible for the arch, when placed under tension, to exert uniform pull against a number of individual tooth clamps. It makes it possible for the orthodontist to be certain beforehand that, having measured the patient's jaw and selected the proper arch size in accordance with the results of the measurements, it will be possible to connect the arch to a series of teeth through tooth clamps connected to the arch, and be sure that the pull against the teeth developed from the combination of torque and tension in the arch, will be uniform at each tooth clamp.

Another object of the invention is to provide an arch having a series of offset segments all having their longitudinal axes disposed in a common plane. In hand-bent arches, the offsetting of a particular segment of an arch having torque, causes the offset segment to be offset not only radially but also in an axial direction (at right angles to the general plane of the arch) thereby offsetting it out of the plane of an adjacent segment.

With such an arch, it has been extremely difficult to connect the arch to the teeth without setting up opposing axial forces between the teeth. It is of course in many cases desirable to set up differing or opposing axial forces between teeth, as, for example, where it is desirable to apply a downward pull to one tooth while applying an upward pull to an adjacent tooth. However, it is essential that it be possible to determine the relation between these opposing axial forces, and it is extremely difficult to do so where the various segments of an arch are offset axially with relation to each other, to extents that are not definitely determined and which ordinarily vary with each arch that is bent. I have discovered that by providing an arch having all segments disposed in a common plane, it is possible to accurately determine the differential between an upward thrust on one tooth and a downward pull on another by initially locating all tooth clamps in a common plane when clamped to the teeth, and then making a measured adjustment (axial shift) of a particular clamp with reference to other clamps. Since it is known that the segments of the arch will be uniformly disposed in a common plane, it is possible to accurately determine from the extent of axial shift of the particular clamp, the degree and direction of force that will be applied to the tooth connected to that particular clamp.

A further object of the invention is to provide a method of constructing an arch having the features above set forth. In this connection, I have discovered that, by initially imparting to the arch its general shape and its predetermined torque, and by subsequently reforming the arch to provide the offset relationship between the various segments thereof, it is possible to preserve the uniform torque in the various segments and at the same time to maintain the offset segments in a common plane.

One of the important features of the method is the application of the final forming pressure to the arch through the medium of die surfaces that are inclined to conform to the torque inclination that has previously been imparted to the arch. This inclination of the die faces is an inclination with reference to direction of movement of the die surfaces in the final forming operation. Another important feature of the method is the utilization of a rolling step in which the arch wire is rolled in the plane in which the finished arch is to be disposed, with the rolling faces disposed an at angle with reference to that plane, such as to produce the desired torque.

A further important feature of the method is the utilization of a stamping step following the rolling step, for converting the continuously curved central portion of the arch into a stepped or offset segmental form and simultaneously narrowing the arch from an expanded intermediate form to its final shape.

Another object is to provide an apparatus for imparting the intermediate arch form to a straight section of wire.

A further object is to provide an apparatus for converting the intermediate arch into the finished arch.

Other objects will become apparent in the ensuing specifications and appended drawings in which.

Specifying the invention in detail, I will first describe the arch.

Figure 1:
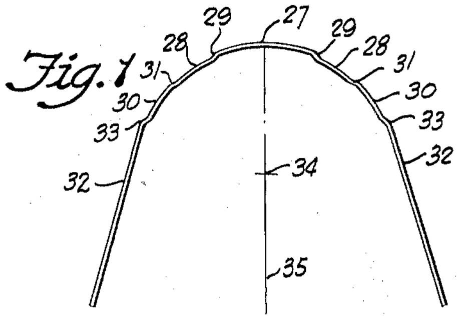
Fig. 1 is a face view of an arch embodying my invention.
Figure 2:
Fig. 2 is a rear view thereof.
Figure 3:
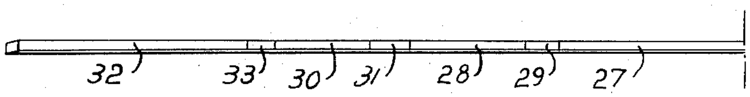
Fig. 3 is an enlarged view of one half of an arch, looking into the open end thereof.

Fig. 1 illustrates an upper jaw arch embodying my invention. The upper arch comprises a central incisor segment 27, a pair of lateral incisor segments 28, one on either side of the central incisor segment 27 and connected thereto by offsets 29, a pair of cuspid segments 30 joined to the lateral incisor segments 28 by offsets 31, and bicuspid-molar sections 32 joined to the cuspid segments 30 by offsets 33.

The central incisor segment 27 and the cuspid segments 30 are shaped and positioned to lie on a common circumference of the arch center 34. The lateral incisor segments 28 are shaped and positioned to lie on a circumference of the center 34 that is disposed inwardly from the segments 27 and 30, i. e., at a smaller radius. The bicuspid-molar sections 32, where they join the offsets 33, lie at a greater radius from the center 34 than the segments 30. They are tangent to a circumference of this greater radius, and diverge at an angle of approximately 30 degrees with reference to each other, or 15 degrees with reference to the median axis 35 of the arch.

The central incisor segment 27 extends circumferentially an arcuate distance of approximately 20 degrees on either side of the axis 35. The lateral incisor segment 28 extends from approximate 23 degrees to approximately 42 degrees from the axis 35. The cuspid segment 30 extends from approximately 45 degrees to approximately 62 degrees from the axis 35, and the bicuspid-molar sections 32 begin at a point approximately 65 degrees from the axis 35.

In an arch of medium size, the central incisor segment 27 and cuspid segments 30 lie at a radius of approximately 1.022 inches from the center 34 to the inner faces of these segments. The lateral incisor segments 28 lie at a radius of approximately 1.011 inches from the center 34, and the bicuspid-molar sections 32 join the offsets 33 at approximately 1.044 inches from the center 34.

The bicuspid-molar sections 32 correspond to the first and second bicuspid and molar positions of the jaw. The segments 27, 28 and 30 correspond to the positions indicated by the names by which they are herein designated. The inward offsetting of the lateral incisor segments 28 corresponds to the inward offsetting of the lateral incisor teeth of the average mouth. The outward offsetting of the bicuspid-molar sections 32 where they join the offsets 33 corresponds to the outward offsetting of the bicuspid teeth from the cuspid teeth.

The angular positions of the segments 27, 28 and 30 and the bicuspid-molar sections 32 with reference to the arch center 34 is such that the segments 27, 28 and 30 will fall opposite the central incisor, lateral incisor and cuspid teeth of any jaw of a size falling within the intermediate range, being centered with reference to these teeth in the average jaw. Similarly, these segments will, in the larger or smaller arch, fall opposite the corresponding teeth of a jaw of larger or smaller size.

Figure 5:
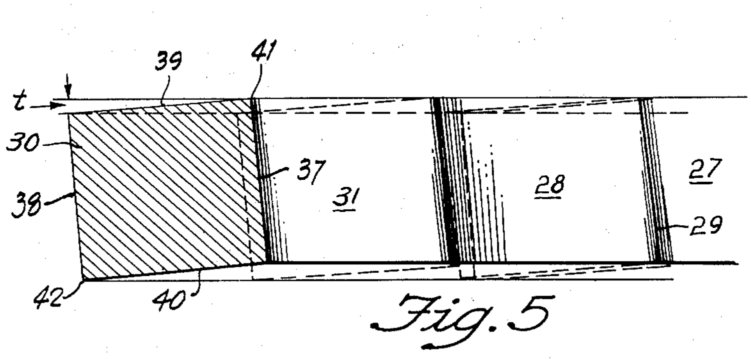
Fig. 5 is an enlarged sectional view thereof taken on the line 5—5 of Fig. 4.

Each of the segments 27, 28 and 30 and sections 32 has uniform torque. This is illustrated in Fig. 5, wherein is shown a cross section of a cuspid section 30, taken at an offset 31, and having labial and buccal faces 37 and 38 respectively and upper and lower faces 39 and 40 respectively. For any segment, the angle *t* defined between an upper or lower face 39 or 40 and a common plane of the arch intersecting a corner 41 or 42, is the same for each segment.

Figure 6:
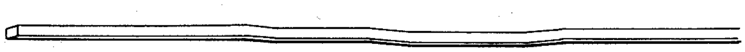
Prior Art Fig. 6
Fig. 6 is a side view of an arch bent by the hand method of the prior art.

An important characteristic of the invention is the fact that the edges 41 and 42 each lie throughout the extent of the arch wholly within a common flat plane. The invention distinguishes in this respect from a hand-bent arch, a sample of which is illustrated in Fig. 6. Any attempt to offset segments of such an arch with reference to each other, after torque has been incorporated in the arch, will necessarily result in an offsetting in directions parallel to the faces 39 and 40. It is not possible manually to offset in a direction diagonal to these faces, whereas in the production of my improved prefabricated arch by machine method, it is possible to offset the segments diagonally with reference to the faces 39, 40 and to effect such offsetting uniformly in a common plane, i. e., the plane of the arch. Fig. 5 illustrates this offsetting in a common plane.

This location of the segments in a common plane greatly increases the accuracy of the orthodontist's use of the arch over the use of a hand-bent arch of the prior art. It is possible to attach a series of tooth clamps to the arch with the definite knowledge that these clamps will engage the teeth in a patient's mouth in a common plane. The exact positions to which the teeth to be straightened will be moved can thus be determined much more easily than in prior practice, and in any event there will be a tendency to bring all teeth into an even line.

Figure 7:
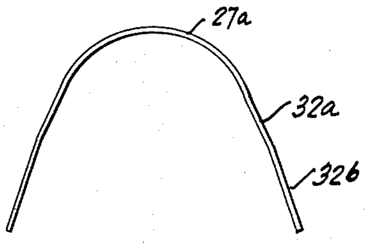
Fig. 7 is a face view of a lower jaw arch embodying the invention.
Figure 4:
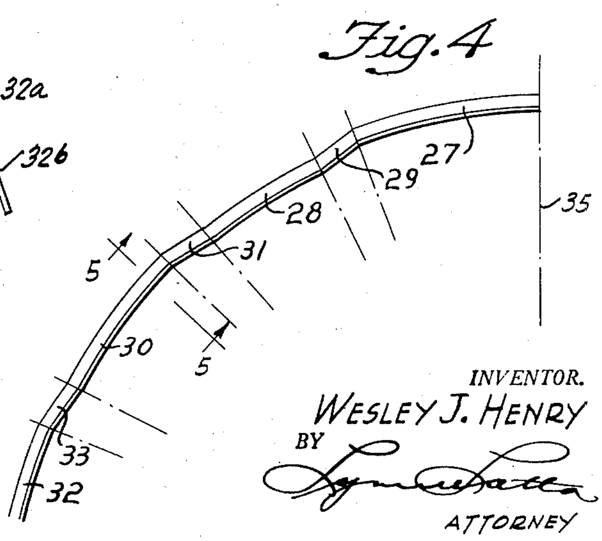
Fig. 4 is an enlarged plan view of a portion of the arch.

The lower arch is shown in Fig. 7. It is somewhat smaller than the upper arch and has a segment 27*a* of uniform curvature and radius, for the incisor and cuspid positions. The bicuspid positions are taken care of by a pair of bicuspid sections 32*a*, tangent to the segment 27*a* and subtending an angle of approximately 50 degrees with reference to each other and a pair of molar sections 32*b* subtending an additional angle of approximately 20 degrees with reference to each other. Each of these sections has uniform torque similar to that described above for the upper arch.

*Method of manufacture*

Figure 11:
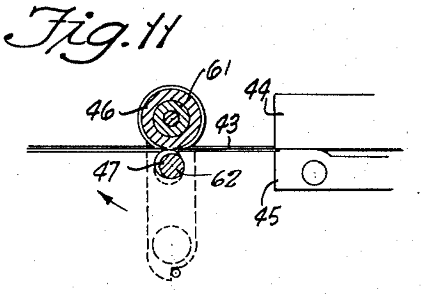
Fig. 11 is a horizontal sectional view of the same taken on the line 11—11 of Fig. 9.
Figure 14:
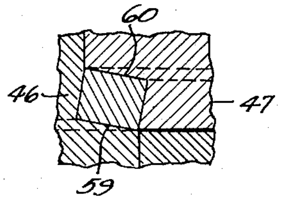
Fig. 14 is an enlargement of a portion of Fig. 13.
Figure 9:
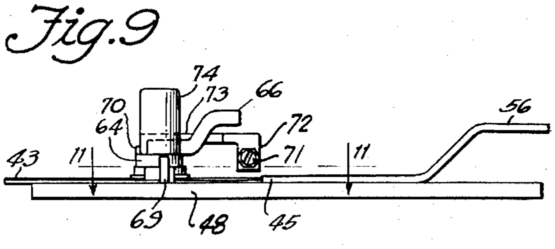
Fig. 9 is a front view of the same.
Figure 10:
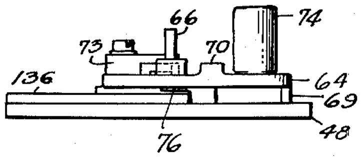
Fig. 10 is a side view of the same.
Figures 8, 15:
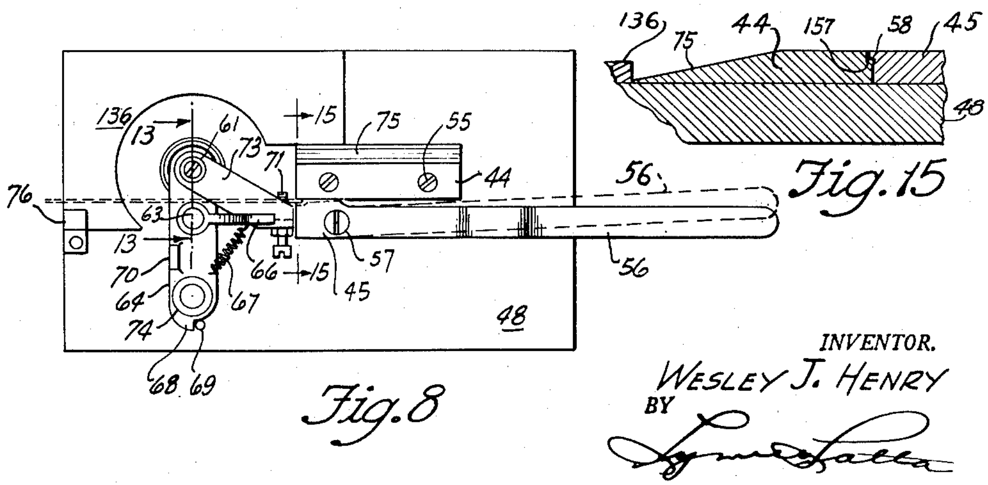
Fig. 8 is a plan view of the first stage forming apparatus.
Fig. 15 is a detail sectional view taken on the line 15—15 of Fig. 8.
Figure 21:
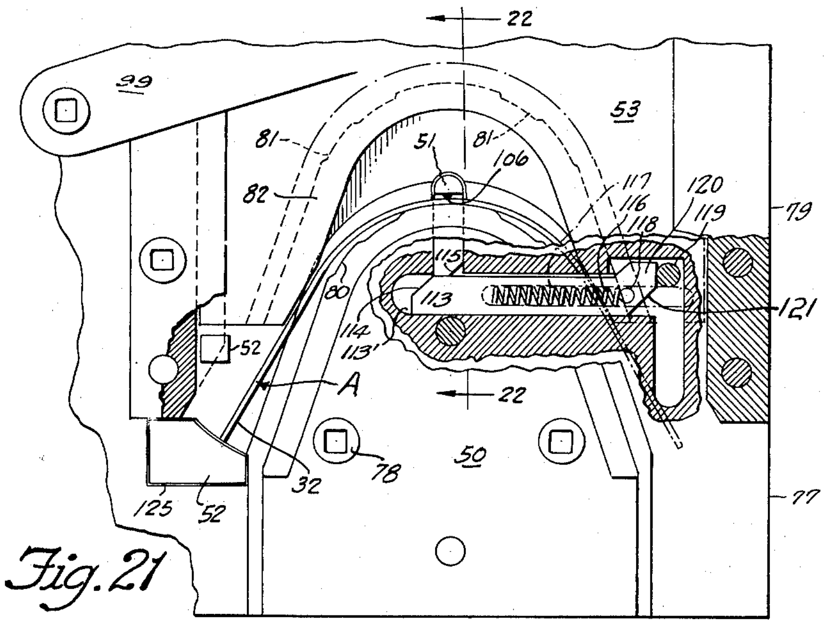
Fig. 21 is an enlarged detail view of the die portion of the mechanism of Fig. 16, with parts broken away and shown in section to better illustrate the construction.

In the manufacture of arches embodying my invention, a length of wire of gold or stainless steel material and of rectangular section is first formed to the shape shown in Fig. 21 by a rolling operation shown in Figs. 8 to 15 inclusive. In this operation, one end of a wire blank 43 is clamped between a pair of jaws 44 and 45 as shown in Fig. 11. The intermediate portion of the blank 43 is extended between a sun roller 46 and a planet roller 47 which travels in an orbit around the sun roller 46. The clamping faces of the jaws 44 and 45 are so inclined as to hold the blank tipped upwardly from the plane of the base plate 48 (to which the orbit of rotation of the roller 47 is parallel) at an angle corresponding to the torque angle *t* of Fig. 5. The rollers 46 and 47 correspondingly grasp the blank 43 between faces which are likewise tipped at the same angle. With the blank 43 thus securely held in the tipped position, the planet roller 47 is rotated around the sun roller 46 until the planet roller 47 is in the position shown in Fig. 12, and the ends of the blank will then be crossed as shown in that figure. The planet roller 46 is then rotated back toward its starting position, permitting the ends of the blank to spring back until the blank assumes the intermediate arch form shown A in Fig. 21. During the entire bending process, the wire is forcibly held in a position tipped up at the torque angle with reference to the plane of bending movement. Consequently, the intermediate arch A has uniform torque throughout its length.

In the next stage of operation, the intermediate arch is inserted into the stamping machine shown in Figs. 16 to 26 inclusive. In this machine, the central incisor region is centered between a lower die member 50 and a hold down jaw 51, as the result of the location of the end of one of the molar sections 32 against a locating stud 52 in the stamping machine. The next stage of operation is to clamp the center of the arch between the hold down jaw 51 and the lower die member 50. The final stage of operation is performed by a sharp blow against the arch from an upper die member 53 which mates with the lower die member 50. This blow is in the nature of a hammer blow and it impresses in the intermediate work piece, the offsets 29, 31, and 33 which have their counterparts in the peripheral regions of the die members 50 and 53 respectively.

*Forming apparatus*

In the initial stage forming apparatus of Figs. 8 to 15 inclusive, the jaw 44 is fixedly secured, as by screws 55, to the base plate 48, and the movable jaw 45 constitutes a short end of a lever 56 which is pivoted at 57 on the base plate 48. The jaw 44 has a shoulder 57 (Fig. 15) on which the blank 43 is adapted to be seated, and the jaw 45 has a flange 58 overhanging the shoulder 57 and having an under face parallel to the shoulder 57. The shoulder 57 and under face of flange 58 are inclined at the torque angle *t* with reference to the base plate 48. Between the shoulder 57 and flange 58 is a gap which is positioned on a line tangent to the forming pass between the rollers 46 and 47. This forming pass is defined by annular grooves 59 and 60 in the respective rollers 46 and 47, the walls of the grooves 59 and 60 being inclined at the torque angle *t* with reference to the base plate 48. The roller 46 is journalled on a post 61 mounted in the plate 48, and the planet roller 47 is journalled on an eccentric pin 62 on the end of a shaft 63. The shaft 63 is journalled in an arm 64 which is pivoted on a reduced portion 65 of the post 61. To the upper end of the shaft 63 is secured a handle 66 which is normally held by a tension spring 67 in a position in which the roller 47 engages the roller 46. By moving the handle 66 against the tension of the spring 67 the roller 47 may be shifted away from the roller 46 to widen the forming pass and provide adequate space to freely insert the wire 43 between the two rollers. This may be done when the arm 64 is in the position shown in Fig. 8 which position is determined by the engagement of the finger 68 on the outer end of the arm against the stop pin 69 mounted in the base plate 48. From this position, the arm 64 may be rotated clockwise, pivoting on the post portions 65, until a stop lug 70 on the arm 64 engages a stop screw 71. The screw 71 is threaded through a lug 72 projecting downwardly from one end of an arm 73 the other end of which is secured upon the upper end of the post 61. The extent of rotating movement of the arm 64 can be adjusted by adjusting the screw 71. A handle 74 is provided on the free end of the arm 64, to facilitate rotating the arm.

Figure 12:
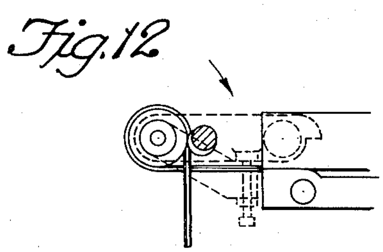
Fig. 12 is a view similar to Fig. 11, with the work in a more advanced stage of operation.
Figure 13:
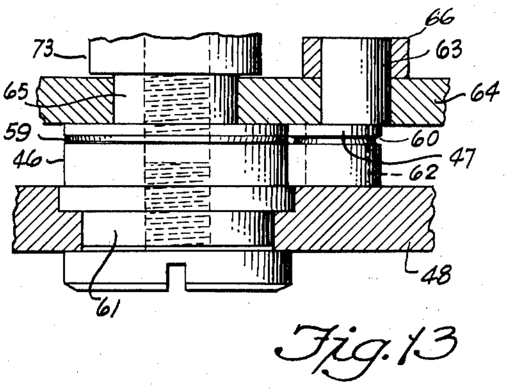
Fig. 13 is a detail sectional view of a portion of the apparatus of Fig. 8, taken on the line 13—13 of Fig. 8.

The jaw 44 has a beveled face 75 providing an inclined plane which deflects the free end of the blank 43 upwardlly above the plane of the captive end of the blank and permits the free end to cross the captive end. This is illustrated in Fig. 12, which shows the terminal position to which the free end of the blank is moved during the bending step. After this position has been reached, the arm 64 is rotated in the reverse direction, back to its starting position, the free end of the wire springs back until the wire assumes the intermediate arch shape 48 of Fig. 21, and the captive end is then released by moving the lever 56 toward the jaw 44, spreading the gripping ends of the jaw apart.

Arch wire is customarily rectangular in cross section, having a somewhat greater width than thickness. In the finished arch, the greater dimension lies substantially parallel to the general plane of the arch, and the lesser dimension is transverse thereto, as indicated in Fig. 5. In order that the operator may make sure that the wire has its wider face extending horizontally, he slips the wire into a pass defined between a guage block 76 and a raised bed member 136 on the base plate 48. The guage block is lined up with the pass between the jaws 44 and 45 and the pass between the rollers 46 and 47 (which-passes lie at the level of bed member 136), so that the wire may be pushed through the guage pass, thence through the roller pass, and thence between the jaws.

*Stamping apparatus*

In Figs. 19 to 26 inclusive I have illustrated a manually operable type of stamping apparatus for performing the final forming operation. It will be understood, however, that it is entirely feasible to substitute for the manual operating means a power driven operating means such as the ram of a punch press.

Figures 22, 23, 24, 25, 26:
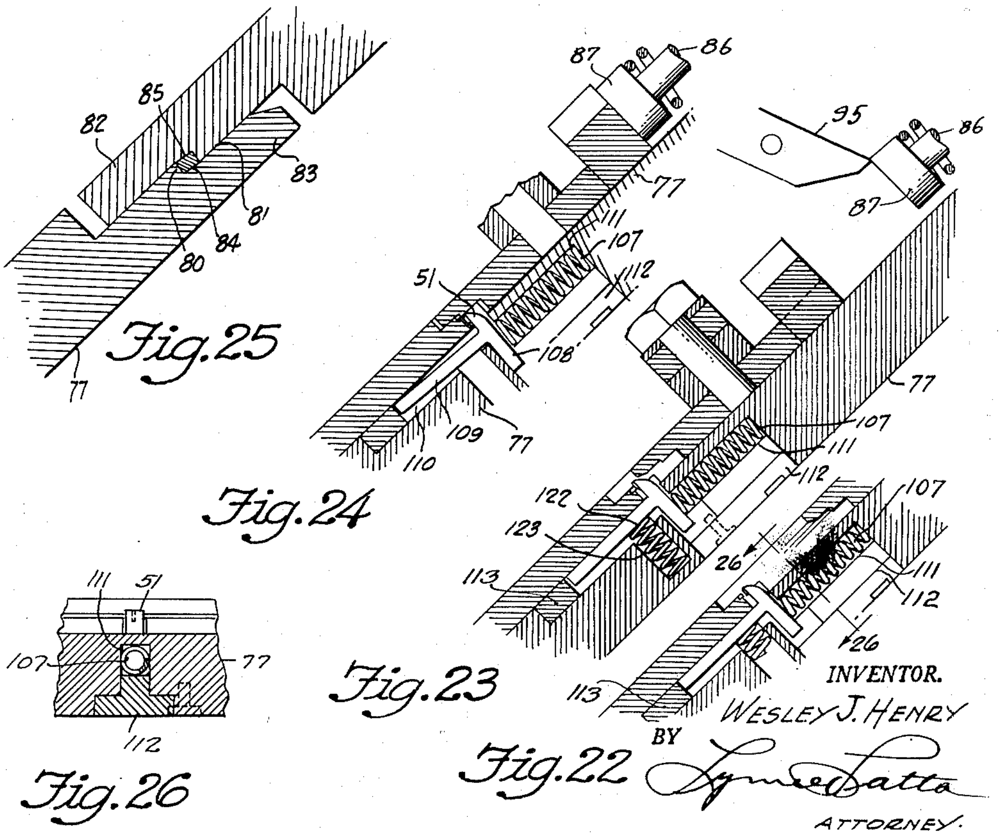
Fig. 22 is a detail sectional view taken on the line 22—22 of Fig. 21.
Fig. 23 is a detail sectional view taken on the same line, showing a subsequent stage of operation.
Fig. 24 is a detail sectional view taken on the same line, showing a subsequent stage of operation.
Fig. 25 is an enlarged detail sectional view taken on the same line.
Fig. 26 is a transverse detail sectional view taken on the line 26—26 of Fig. 22.

The die elements 50 and 53 are mounted flatly upon a base plate 77, which is preferably mounted on an incline as shown in Figs. 22–25. The lower die element 50 is fixedly attached as by means of screws 78, and the upper die element 53 is slidable between ways 79 which are secured to the plate 77. The fixed die element 50 has a notched peripheral step portion 80 corresponding to the shape of the finished arch. The movable die element 53 has a notched step portion 81 conforming to the shape of the peripheral step portion 80 with the thickness of the arch member 48 interposed therebetween, and has an inwardly extending flange 82 overhanging the shoulder 81. When the die members are closed together, the flange 82 overhangs the peripheral step portion 80, slidably engaging the same as indicated in Fig. 25. Extending beyond the peripheral step portion 80, the die member 50 has a peripheral flange 83 which slidably engages beneath the step portion 81 of the movable die member 53. The step portions 80, 81 have peripheral shoulders which correspond to the contour of the inner and outer faces respectively of the finished arch and are inclined at the torque angle $t$ from the normal relative to the general plane of movement of the die member 53. These shoulders are adjoined by faces 84 and 85 respectively which are inclined at the torque angle $t$ with reference to said plane of movement. These shoulders and faces define a space corresponding to the surface contours of the finished arch. It will now be apparent that as the die members are brought together forming pressure will be applied to the intermediate arch member 48 in the general plane of the arch, and the torque angle will be maintained as offsets 29, 31 and 33 are formed in the arch.

In order that the offsets may be properly formed, I find that it is necessary to bring the die members together with a hammer blow effect. This is achieved in the manually operated machine by utilizing a ram comprising a shaft 86, a ram head 87 on the lower end thereof, and a weight 88 on the upper end thereof. The shaft 86 is slidably mounted in a bearing 89 which in turn is mounted in a bracket 90 secured upon the upper end of the base plate 77. A coil spring 91 has its upper end pocketed in a recess 92 in the bracket 90 and its lower end engaged against the ram head 87. A bracket 93 straddles the spring 91 and is secured to the base plate 77. To the lower end of the bracket 93 is pivoted, at 94, a trigger 95 the inner end of which is normally engaged beneath the ram head 87. Under the pressure of the spring 91, the trigger 95 is urged in a clockwise direction as viewed in Fig. 17, but is restrained against moving in this direction beyond the position shown in Fig. 17 by its engagement with a shoulder 96 at the lower end of the bracket 93. The trigger 95 is urged in the same direction by a resetting spring 97 connected under tension between its outer end and a post 98 mounted in the bracket 93.

A manual operating lever 99 is pivoted at 100 to the base plate 77, and is connected by a pivot 101 to the center of the movable die member 53. A lug 102 on the lever 99 has an aperture through which extends a pull rod 103 the upper end of which is bent at right angles as at 104 and extended through the outer end of the trigger 95 to form a pivotal connection therewith. The lower end of the pull rod 103 is threaded and carries a pair of locking nuts 105, the upper of which constitutes an abutment which is engaged by the lug 102 as the lever 99 is moved downwardly.

It may now be noted that as the lever 99 is moved downwardly, the die member 53 will be slowly moved downwardly therewith, closing the gap between itself and the die member 50 and imprisoning the intermediate arch member 48 between the step members 80, 81. Toward the lower limit of movement of the lever 99, the lug 102 engages the abutment nut 105 and further movement of the lever 99 is thence transmitted through the pull rod 103 to the trigger 95, moving the latter counterclockwise, pushing the ram head 87 upwardly against the resistance of the spring 91 and further loading the latter. When the gap between the die members has been reduced to approximately a quarter inch, the trigger 95 will release the ram head 87 and the spring 91 will exert its full pressure against the ram, moving the latter downwardly with an acceleration which is transformed into momentum in the weight 88. As the die members come together upon the arch, the kinetic energy thus induced in the weight 88 is delivered through the ram head 87 to the upper end of the movable die member 53 in the form of a heavy blow. This blow provides an instantaneous high pressure between the die elements which is sufficient to form the offsets in the arch. In order that the segments 27, 28 and 30 may be accurately centered in the arch, I provide the stop 52 for positioning one end of the arch, and I also provide the hold down jaw 51 for clamping the center of the arch against the crown of the die member 50. The jaw 51 has a knife edged tooth 106 which engages the crown of the arch under yielding pressure provided by a compression spring 107 (Figs. 22–24). The tooth 106 serves the additional function of placing a center mark at the crown of the arch, which center mark is utilized by the orthodontist in working with the arch, to determine the exact center of the arch. Marking is facilitated by drawing the tooth 106 transversely across the outer edge of the arch. This is accomplished by a retracting movement of the jaw 51 which is necessary in order that it may be cleared by the upper die member 53 as it closes upon the lower die member.

The jaw 51 forms one end of a head 108 on the upper end of a hammer shaped element having a shaft 109 which is loosely received in a recess 110 between the fixed die member 50 and the base plate 77. The compression spring 107 is disposed in a recess 111 in the base plate 77, and confined therein by a closure plate 112. The spring 107 urges the jaw shaft 109 downwardly against a reciprocating cam member 113 which, when the upper die member is retracted, is projected beneath the shaft 109 as indicated in Figs. 21 and 22, and holds the shaft 109 and jaw 51 in an elevated position in which the tooth 106 is spaced upwardly from the arch member 48. The cam member 113 is mounted for sliding movement in a recess 113' in the base plate 77. The end of the cam member 113 has on inclined corner 114 and the lower end of the shaft 109 has a correspondingly inclined corner 115. The coil spring 116 is engaged under compression between the end of a pocket 117 in the die member 50 and a pin 118 mounted in the cam member 113, constantly urging the cam member 113 rightwardly as viewed in Fig. 21. Such rightward movement is normally restrained by a pin 119 which is mounted in the rightward arm of the movable die member 53, on the under side thereof. The pin 119 engages the outer side of a head 120 on the cam member 113, normally holding the cam member 113 in a leftward position. As the die member 53 moves downwardly, the pin 119 descends to a point where an inclined corner 121 on the head 120 comes opposite the pin 119 and permits the cam member 113 to be retracted rightwardly under the urge of the spring 116.

As the cam member 113 is thus retracted, the jaw 51 will descend into engagement with the arch member 48, as indicated in Fig. 23. In the final stage of descent of the die member 53, the flange 82 and step member 81 thereof will successively engage the beveled nose of the jaw 51, forcibly moving the jaw 51 rearwardly out of the path of movement of the step member 81, until finally the jaw attains the position shown in Fig. 24, and the die members are closed upon the arch.

As the upper die member is retracted upwardly, the jaw 51 will be returned forwardly and upwardly to its initial position shown in Fig. 22 by the pressure of a spring 122 against the under side of the shaft 109 and by the upward camming engagement of the corner 114 of cam 113 against corner 115 of shaft 109. The spring 122 is seated in a socket 123 in the base plate 77.

Figures 16, 17, 19, 20:
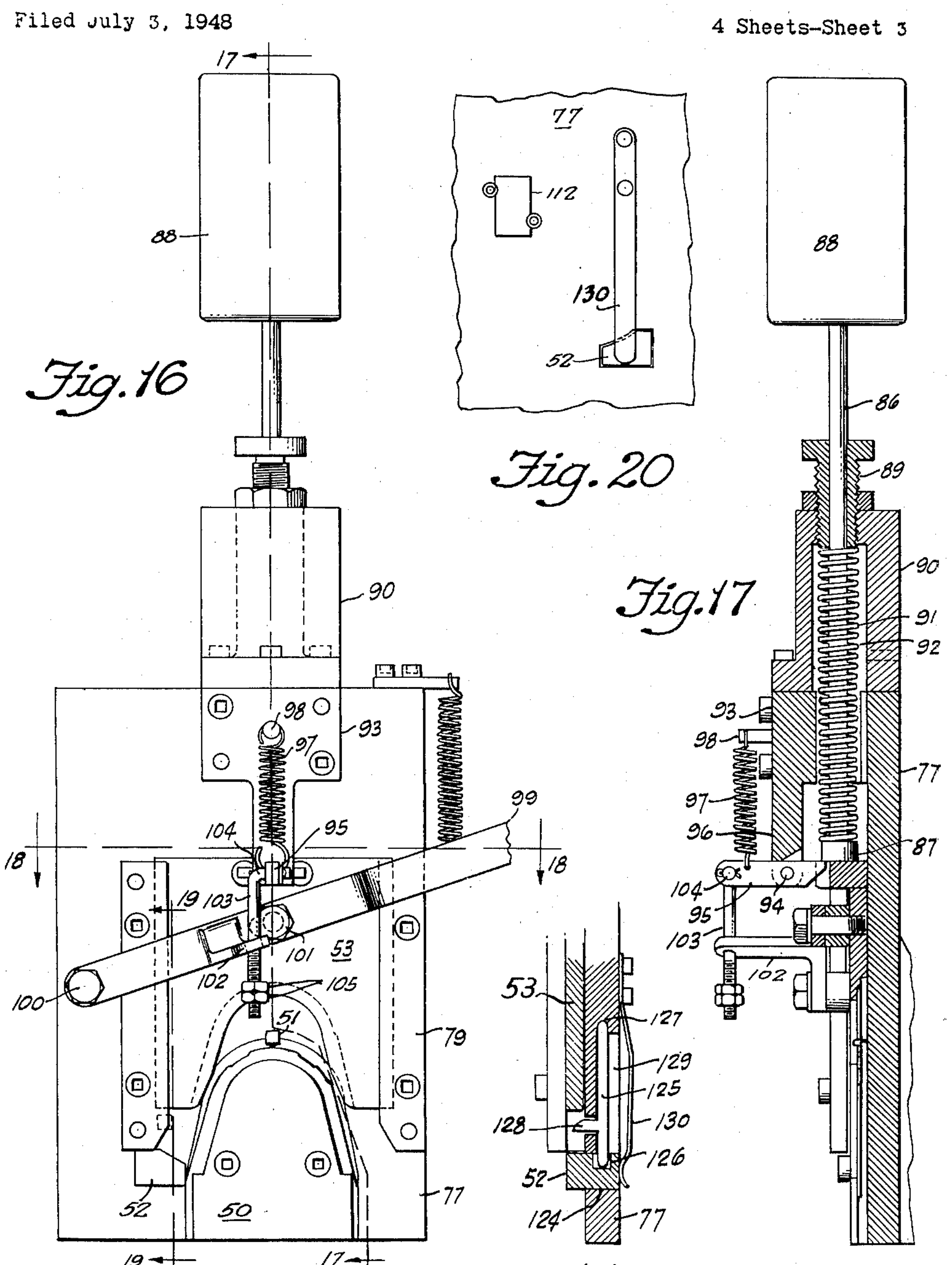
Fig. 16 is a plan view of the apparatus for performing the final forming operation.
Fig. 17 is a longitudinal sectional view of the same taken on the line 17—17 of Fig. 16.
Fig. 19 is a detail sectional view of the same taken on the line 19—19 of Fig. 16.
Fig. 20 is a detail view of a portion of the rear or under side of the apparatus of Fig. 16.
Figure 18:
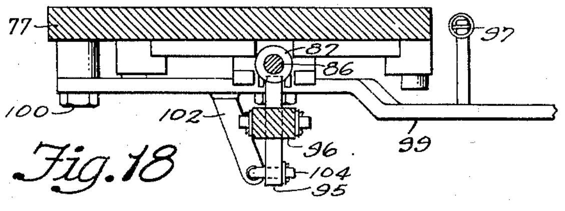
Fig. 18 is a transverse sectional view of the same taken on the line 18—18 of Fig. 16.

The stop member 52 is retracted rearwardly as the upper die member 53 moves downwardly, in order that the latter may clear the stop member. To this end, the stop member 52 is slidably mounted in an aperture 124 in the base plate 77, as shown in Fig. 19. A rock lever 125 has its lower end engaged in a socket 126 in the stop member 52, its upper end fulcrumed in a socket 127 in the base plate 77, and has, intermediate its ends, a cam projection 128 which normally extends into the path of movement of the left leg of the movable die member 53. The rock lever 125 is swingably mounted in a recess 129 in the base plate 77. A leaf spring 130 has one end secured to the base plate 77 and its other end pressing forwardly against the stop member 52 to normally urge it to its projected position in which it serves to gauge the proper position of the arch member 48. As the upper die member 53 moves downwardly, its left leg will engage the cam projection 128 and swing the rock lever 125 rearwardly thus withdrawing the stop member 52 downwardly to the plane of the upper face of the base plate 77.

I claim:

1. Steps in the method of prefabricating an orthodontic arch comprising: providing a blank of rectangular cross section wire of predetermined length; securing said blank in a position inclined at a torque angle with reference to a predetermined plane, bending the central region of said blank in said plane, whereby to form an intermediate arch having a substantialy semicircular central portion and a pair of straight side arms; and subsequently offsetting portions of the arch in the plane of the arch inwardly with reference to adjacent portions of the arch while rigidly holding said portions and adjacent portions at the predetermined torque angle with reference to said plane.

2. Steps in the method of prefabricating an orthodontic arch, comprising: providing a blank of rectangular cross section wire of predetermined length, bending the intermediate portion of the arch into substantially semi-circular conformation while rigidly holding said intermediate portion and at least one of the end portions of the blank at a fixed torque angle with reference to the plane of bending and subsequently offsetting portions of the arch in the plane of the arch inwardly with reference to adjacent portions thereof while rigidly holding said portions and adjacent portions inclined at the aforesaid torque angle with reference to said plane.

WESLEY J. HENRY.

REFERENCES CITED

The following references are of record in the file of this patent:

UNITED STATES PATENTS

| Number | Name | Date |
|---|---|---|
| Re. 4,919 (of 32,947) | Kieser | May 28, 1872 |
| 164,710 | Beyer | June 22, 1875 |
| 234,022 | Geiger | Nov. 2, 1880 |
| 748,947 | Helmold | Jan. 5, 1904 |
| 959,452 | Burns | May 31, 1910 |
| 1,014,028 | Angle | Jan. 9, 1912 |
| 1,054,132 | Miner | Feb. 25, 1913 |
| 1,340,138 | Miller | May 11, 1920 |
| 1,471,785 | Fernald | Oct. 23, 1923 |
| 1,546,526 | Wasson | July 21, 1925 |
| 1,549,739 | Angle | Aug. 18, 1925 |
| 1,710,262 | Kellogg | Apr. 23, 1929 |
| 1,826,502 | Poole | Dec. 15, 1931 |
| 1,874,597 | Olson | Aug. 30, 1932 |
| 1,878,314 | Peters | Sept. 20, 1932 |
| 1,995,116 | Drissner | Mar. 19, 1935 |
| 2,277,360 | Wagner | Mar. 24, 1942 |